United States Patent [19]

Klein et al.

[11] 3,838,280

[45] Sept. 24, 1974

[54] AMPLIFIER AND QUADRUPOLE MASS SPECTROMETER UTILIZING SAME

[76] Inventors: Fritz S. Klein, Meonot Wolfson A; Jehuda Yinon, 47 Menucha Venachla, both of Rehovot, Israel

[22] Filed: Feb. 16, 1973

[21] Appl. No.: 333,099

[30] Foreign Application Priority Data

Feb. 25, 1972 Israel .................................... 38837

[52] U.S. Cl. ................................ 250/292, 250/290

[51] Int. Cl. ........................................... H01j 39/34

[58] Field of Search ........... 250/280, 281, 290, 293, 250/283, 292

[56] References Cited

UNITED STATES PATENTS 3,641,340 2/1972 Grinten et al. ...................... 250/292

*Primary Examiner*—James W. Lawrence

*Assistant Examiner*—B. C. Anderson

*Attorney, Agent, or Firm*—Browdy and Neimark

[57] ABSTRACT

The negative ion output of a quadrupole mass spectrometer utilizes an amplifier system including an electron multiplier a differential amplifier, an operational amplifier, an emitter follower, and a photoisolator connected to receive the output of the emitter follower.

3 Claims, 1 Drawing Figure

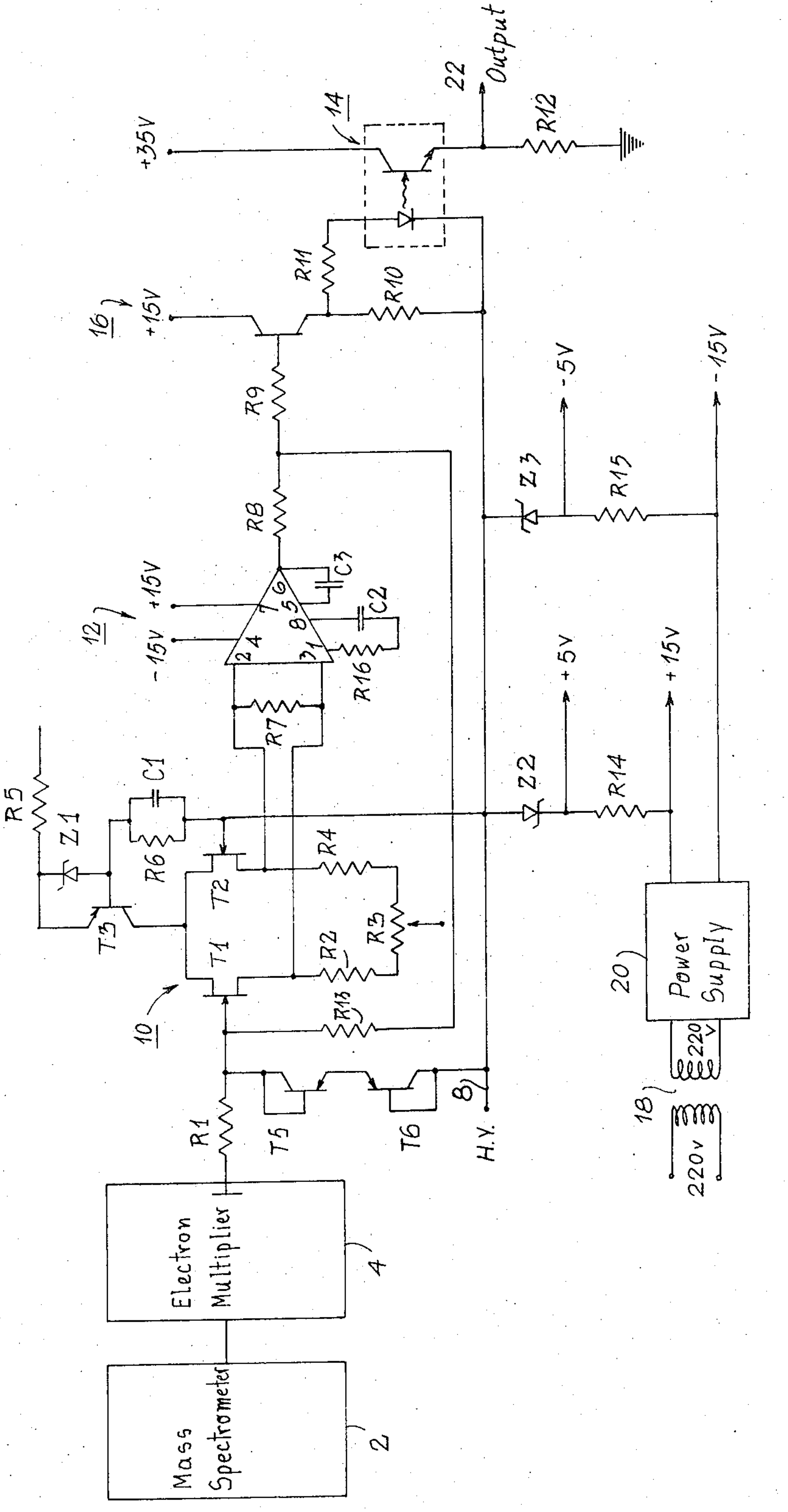
Mass Spectrometer
2
Electron Multiplier
4
R1
T5
T6
H.V.
8
10
T1
T2
T3
Z1
R5
R6
C1
R2
R3
R4
R13
R7
12
-15V
+15V
C2
C3
R16
R8
R9
16
+15V
R10
R11
14
+35V
22
Output
R12
Z2
R14
+5V
+15V
Z3
R15
-5V
-15V
20
Power Supply
18
220v
220 V

AMPLIFIER AND QUADRUPOLE MASS SPECTROMETER UTILIZING SAME

BACKGROUND OF THE INVENTION

The present invention relates to an amplifier, and particularly to one whose input is to be connected to a high voltage source and whose output must be isolated from the high voltage source. One application of the amplifier is for use with a quadrupole mass spectrometer, for measuring the negative ions thereof, and the invention is therefore described below with respect to that application.

In measuring the negative ion output of a mass spectrometer, because of the generally low output signal it is necessary to use an electron multiplier having a relatively low input voltage but a very high output voltage. For example, when using a Bendix M-308 magnetic Multiplier with a Quadrupole mass spectrometer, the input voltage of the multiplier is about +300 volts, and the output at the anode is about 2,000 volts. In such an arrangement, the ion-measuring system (including the amplifier and output devices such as oscilloscope, recorder, or the like) would have to be floated on the high voltage of the anode.

It has been proposed to provide an isolation capacitor between the anode of the multiplier and the measuring system, and it has also been proposed to use a high voltage isolated pulse transformer instead of the isolation capacitor. However, in both of the above arrangements, the system can operate solely in the pulse mode, and not in the continuous ion current measurement mode.

BRIEF SUMMARY OF THE INVENTION

The present invention provides an amplifier system which can be used for the foregoing application and still be operated in the continuous ion current measurement mode, thus greatly simplifying the necessary electronic equipment and also decreasing response times.

According to one aspect of the present invention, there is provided an amplifier system, comprising: an amplifier circuit receiving and amplifying the input signal; an emitter follower circuit connected to receive the output of said amplifier circuit; and a photo-isolator connected to receive the output of said emitter follower circuit; said emitter follower circuit matching the impedance between the amplifier circuit and the photo-isolator.

In the described embodiment, the amplifier circuit comprises a differential amplifier and an operational amplifier. The differential amplifier includes metal-oxide-semiconductor field-effect transistors receiving electrical signals at high input resistance and having an output matched to the operational amplifier.

According to another aspect of the invention, there is provided the combination of a mass spectrometer and an electron multiplier connected to receive the output thereof, the electron multiplier having a high voltage anode, the amplifier circuit described above being connected to receive the output of the multiplier anode.

Further features and advantages of the invention will be apparent from the description below.

BRIEF DESCRIPTION OF THE DRAWING

The invention is herein described, by way of example only, with reference to the accompanying drawing which is a circuit diagram of one form of amplifier system constructed in accordance with the invention for use in measuring the negative ions output of a mass spectrometer.

DESCRIPTION OF THE PREFERRED EMBODIMENT

In the drawing, block 2 designates a quadrupole mass spectrometer having an output of negative ions which is to be measured. This output is fed to an electron multiplier 4, for example a Bendix N-308 magnetic multipler, whose output anode 6 is connected to a high voltage source 8, for example about +2,000 volts.

The output signal from the electron multiplier 4 is fed via resistor R1 to a differential amplifier 10 consisting of two metal-oxide-semiconductor field-effect transistors (MOS FET) T1 and T2 and a constant current source including transistor T3 and Zener diode Z1. A further pair of transistors T5 and T6 are connected as back-to-back diodes to protect the differential amplifier against overload. The differential output is fed to the operational amplifier 12, the output of which is fed back to the input of the differential amplifier via resistor R13. The output of the amplifier is fed to the optical isolator 14 via an emitter follower 16 including transistor T4 and resistor R10.

The DC voltage is supplied through an isolation transformer 18, via a regulated power supply 20, resistors R14,R15, and Zener diodes Z2,Z3.

The signal output at terminal 22 may be fed to any type of recording or indicating device, such as a strip chart recorder or oscilloscope.

To simplify the description the standard components of the circuit are illustrated in the drawing but are not described herein in detail. For purposes of example, the following may be used for the various components illustrated in the drawing:

Photo-isolator 14: T1XL101
Operational Amplifier 12: uA709

| | |
|---|---|
| T1: 3N 163 | R1 : 100K |
| T2: 3N 163 | R2 : 10K |
| T3: 2N3905 | R3 : 10K |
| T4: 2N3904 | R4 : 10K |
| T5: 2N3906 | R5 : 2.2K |
| T6: 2N3906 | R6 : 3.3K |
| | R7 : 10K |
| Z1: ZF4.7 | R8 : 50 |
| Z2: ZF5.1 | R9 : 58 |
| Z3: ZF5.1 | R10: 1.2K |
| | R11: 1K |
| C1: 0.1uF | R12: 27K |
| C2: 4700 pF | R13: 10M |
| C3: 220 pF | R14: 2.2K |
| | R15: 2.2K |
| | R16: 2.4K |

The amplification of the system depends on the value of the input resistor R1. For an input resistor of 10 Mohm the amplification is 40.

The amplification of FET differential amplifier 10, operational amplifier 12, and emitter follower 16 is 100. The optical isolator 14 has an attenuation of 2.5. The linearity of the device is better than 3 percent for a voltage range of 6 to 11 volts at the input of the optical isolator having a listed insulation: input-output voltage of 5000 volts. The dynamic range of the entire device can be expanded by changing the value of the input resistor.

Many modifications, variations, and other applications of the illustrated embodiment will be apparent.

What is claimed is:

1. An amplifier and quadrople mass spectrometer combination comprising:

a quadropole mass spectrometer;

an electron multiplier connected to receive the output of said spectrometer, the electron multiplier having a high voltage anode;

an amplifier system connected to receive the output of said high voltage anode comprising an amplifier circuit receiving the input signal; an emitter follower circuit connected to receive the output of said amplifier circuit; and a photo-isolator connected to receive the output of said emitter follower circuit; said emitter follower circuit matching the impedance between the amplifier circuit and the photo isolator; and output means connected to receive the output of said amplifier system.

2. The amplifier and quadropole mass spectrometer combination according to claim 1, wherein said amplifier circuit comprises a differential amplifier and an operational amplifier.

3. The amplifier and quadropole mass spectrometer combination according to claim 2, wherein said differential amplifier includes metal-oxide semiconductor field-effect transistors receiving electrical signals at high input resistance and having an output matched to the operational amplifier.

* * * * *